(12) United States Patent
Fujii

(10) Patent No.: US 7,294,944 B2
(45) Date of Patent: Nov. 13, 2007

(54) BRUSHLESS MOTOR

(75) Inventor: Yoshio Fujii, Kyoto (JP)

(73) Assignee: Nidec Corporation, Kyoto (JP)

( * ) Notice: Subject to any disclaimer, the term of this patent is extended or adjusted under 35 U.S.C. 154(b) by 190 days.

(21) Appl. No.: 11/239,324

(22) Filed: Sep. 30, 2005

(65) Prior Publication Data

US 2006/0071563 A1    Apr. 6, 2006

(30) Foreign Application Priority Data

Oct. 4, 2004    (JP) .............................. 2004-290867

(51) Int. Cl.
```
H02K 11/04    (2006.01)
H02K 5/00     (2006.01)
H02K 7/00     (2006.01)
H02K 21/00    (2006.01)
H02K 29/00    (2006.01)
G11B 25/00    (2006.01)
G11B 17/00    (2006.01)
```
(52) U.S. Cl. .................... 310/67 R; 310/68 B; 310/89; 310/90; 310/156.05; 360/97.02; 360/98.07; 360/99.08
(58) Field of Classification Search ............. 310/67 R, 310/68 R, 68 B, 89, 90, 156.05; 360/97.02, 360/98.07, 98.08, 99.04–99.12
See application file for complete search history.

(56) References Cited

U.S. PATENT DOCUMENTS 5,006,943 A * 4/1991 Elsasser et al. .......... 360/99.08
5,877,574 A * 3/1999 Molnar ........................ 310/215
6,921,993 B2 * 7/2005 Xu et al. ................... 310/67 R
6,933,649 B2 * 8/2005 Fujii et al. .................... 310/216
7,015,619 B2 * 3/2006 Tanabe et al. ............... 310/254
7,109,623 B2 * 9/2006 Wada et al. ............ 310/156.45

FOREIGN PATENT DOCUMENTS

| JP | 07231602 A | * | 8/1995 |
| JP | 2003-319631 | | 11/2003 |
| JP | 2005229698 A | * | 8/2005 |

* cited by examiner

Primary Examiner—Tran Nguyen
(74) Attorney, Agent, or Firm—Westerman, Hattori, Daniels & Adrian, LLP

(57) ABSTRACT

A compact, highly accurate and inexpensive brushless motor is disclosed. A bearing is fixed to the inner periphery of a cylindrical portion of a housing, and a shaft is rotatably inserted through the bearing to cover the housing. A yoke arranged at the forward end of the cylindrical portion of the housing is fixed on the shaft. In this configuration, the bearing is arranged at a position on the inside of the yoke, and therefore the motor can be reduced in size to the extent of superposition between the yoke and the housing. The bearing is fixed to one member of the housing, and therefore a high accuracy is realized.

8 Claims, 7 Drawing Sheets

BRUSHLESS MOTOR

BACKGROUND OF THE INVENTION

1. Field of the Invention

This invention relates to an inner rotor-type brushless motor having a slide bearing.

2. Description of the Related Art

Many electronic devices acquire power from a motor. In recent years, with the reduction in size and price and the increase in accuracy of the electronic devices, demand has increased for smaller, inexpensive and more accurate motors used in the electronic devices.

A sectional view, as taken in axial direction, of the structure of the conventional inner rotor-type brushless motor is shown in FIG. 7.

The brushless motor shown in FIG. 7 includes a rotor A with a rotary shaft member A1 inserted thereon, bearings B1, B2 for rotatably supporting the rotor A, a stator C, a circuit board D and covers E1, E2 for accommodating these component parts.

The rotor A has a structure in which the rotary shaft member A1 fitted in an inner through hole of a cylindrical rotor core A2, and a magnet F is fitted on the outer peripheral surface of the rotor core A2.

The stator C is arranged in radially slightly spaced relation with the magnet F. The stator C is formed by turning a winding C2 around the stator core C1 configured of a stack of a plurality of lamination layers.

The circuit board D is arranged under the stator C as viewed in axial direction. The circuit board D includes a control IC D1 and a position sensor D2 for detecting the magnetism. The position sensor D2 is arranged in radial direction in spaced and opposed relation with the magnet F. The position sensor D2 detects the magnetism of the magnet F and sends a position detection signal to the control IC D1. Based on the position detection signal, the control IC D1 controls the current supplied to the winding C2 and thus controls the motor rotation.

At positions above and under the rotor core A2 as viewed in axial direction, bearings B1, B2, respectively, are inserted on the rotary shaft member A1. The bearings B1, B2 rotatably support the rotor A.

To accommodate these component parts, the covers E1, E2 are arranged. The cover E1 has the shape of a substantially bottomed cylinder, and is fixed with the cover E2 having the shape of a substantially bottomed cylinder at the cylindrical end surface of the cover E1. The covers E1, E2 both have a central recess. The recesses accommodate the bearings B1, B2, respectively, internally fitted therein. The stator C is also accommodated fixedly with an adhesive or the like in the cover E1.

In the structure of the inner rotor-type brushless motor shown in FIG. 7, however, the rotor core A2 is not hollow, and therefore, the bearings B1, B2 are required to be arranged at positions above and under the rotor core A2 as viewed in axial direction. To accommodate the bearings B1, B2, therefore, the covers E1, E2 are required to be correspondingly larger. This also makes it difficult to reduce the size of the motor.

Further, the two covers E1, E2 of the motor are required to be fabricated to cover the motor. This increases both the number of parts and the cost of motor fabrication, thereby preventing the most cost from being reduced. In the case where the bearings B1, B2 are held by the covers E1, E2 which are different parts, the assembly error of the covers E1, E2 constituting different parts combines with the dimensional error of each unit part thereby to deteriorate the coaxiality of the rotary shaft member A1. Specifically, the center of the bearings B1, B2 are respectively deviates from the rotational shaft, and the rotary shaft member A1 is undesirably supported at an angle. As a result, the rotary shaft member A1 deviates from the rotational center axis and wobbles, thereby often having an adverse effect on a mating part to which the force is transmitted from the rotary shaft member A1.

In the case where a gear is fitted on the forward end of the rotary shaft member A1 to transmit the force through a mating gear in mesh, for example, a low coaxiality of the rotary shaft member A1 would lead to an unsatisfactory engagement with the mating gear, and imposes an offset load on the gears of both the motor and the mating part. Once at least one of the gears of the motor and the mating part is damaged, the gear may be cut or dented. Further, the cut or the dent may cause a bite failure, generating vibrations and noises. In the worst case, the gear may be broken, thereby causing a fatal malfunction of the electronic device carrying the motor.

BRIEF SUMMARY OF INVENTION

Accordingly, it is an object of this invention to provide a compact brushless motor in which the bearing is fitted on the housing to improve the accuracy of the rotary shaft on the one hand and the internal heat of the motor is discharged on the other hand.

In order to achieve this object, according to this invention, there is provided a brushless motor having a rotational axis comprising: a cover for covering an outer part of the motor, the cover having a cover cylindrical portion with a bottom surface downward and with a open end upward; a housing having a housing cylindrical portion, the housing connected fixedly with a central portion of the bottom surface of the cover and the housing cylindrical portion located at a rotationally symmetric location around the rotational axis; a bearing fixed to an inner peripheral surface of the housing cylindrical portion; a rotary shaft rotatably supported by the bearing about the rotational axis; a rotor yoke located at an upper part of the housing, the rotor yoke having a rotary shaft connecting portion connected fixedly with an outer surface of the rotary shaft, a roof surface portion connected integrally with an upper end of the rotary shaft connecting portion and extending radially outward, and a yoke cylindrical portion connected integrally with a radially outer end of the roof surface portion and extending axially downward for covering the housing; a main magnet fixed on an outer peripheral surface of the yoke cylindrical portion; a stator fixed on an inner peripheral surface of the cover cylindrical portion and an inner surface of the stator confronting an outer peripheral surface of the main magnet with a gap; a circuit board located at an upper part of the cover, wherein an outer end of the circuit board is fixed to an upper end part of the cover; and a position sensor mounted on the circuit board for detecting the rotational position of the rotor; wherein the rotary shaft, the bearing, the housing cylindrical portion, the yoke cylindrical portion, the main magnet, the stator and the cover cylindrical portion are arranged in order radially outward from the rotary shaft to the cover.

In this brushless motor described above, the housing is erected on the inside of the rotor yoke, and the bearings are arranged along the height in axial direction in the rotor yoke. Therefore, the height of the motor in axial direction can be reduced. Also, the bearings are arranged on a single housing. As compared with a case in which the bearings are arranged on different parts, therefore, the error due to the assembly of different parts is eliminated and the coaxiality of the bearings improved. As a result, the accuracy of the rotary shaft inserted in the bearings is improved.

DETAILED DESCRIPTION OF THE INVENTION

Figure 1:
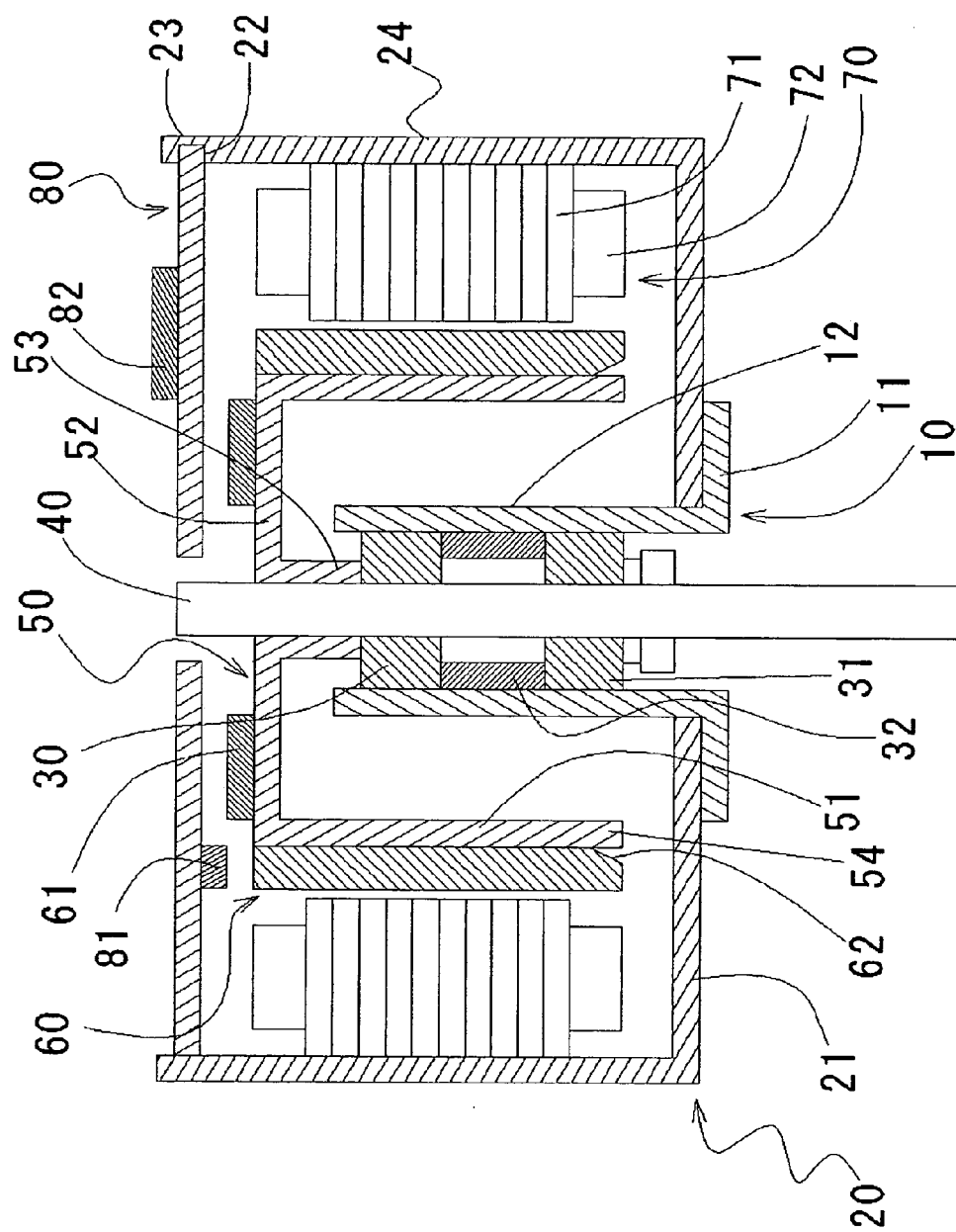
FIG. 1 is a sectional view of a motor taken in axial direction of the motor according to an embodiment of the invention.

An embodiment of the invention is explained below with reference to the drawings. For facilitating the understanding, the vertical direction in FIG. 1 is described as "axially vertical direction", to which the actual mounting position of a motor is not limited.

First, the whole motor structure is explained with reference to FIG. 1.

A cover 20 for covering an outer part of the motor having the shape of a bottomed cylinder includes a bottom surface portion 21 downward and with a open end upward and a cover cylindrical portion 24. A through hole is formed in the central part of the bottom surface portion 21 of the cover 20.

A housing 10 has the shape of a hollow cylinder. The housing 10 has, in the lower part thereof as viewed in axial direction, a hook 11 connected fixedly with a central portion of the bottom surface of the cover and a housing cylindrical portion 12 located at a rotationally symmetric location around the rotary shaft. Two bearings 30, 31 are internally fixed to an inner peripheral surface of the housing cylindrical portion 12. Between the two bearings 30, 31, a cylindrical felt 32 constituting an oil-soaked member soaked with oil is arranged to connect the bearings to each other.

The housing 10 is inserted through the central through hole of the bottom surface portion 21 of the cover 20, which is brought into contact with the hook 11 of the housing 10. In this way, the contact portion is, for example, welded for coupling.

An outer frame formed of the cover 20 and the housing 10 accommodates a rotor and a stator 70. The rotor is formed of a shaft 40, a rotor yoke 50, a magnet 60 and a FG magnet 61.

In the rotor, the rotary shaft connecting portion 53 of the rotor yoke 50 having the shape of a bottomed hollow cylinder is coupled to the shaft 40 constituting a rotary shaft member, and the magnet 60 is fixed by adhesive, for example, on the outer periphery of the yoke cylindrical portion 51 of the rotor yoke 50. Also, the FG magnet 61 is fixed by adhesive, for example, on the roof surface portion 52 of the rotor yoke 50.

In this rotor, the shaft 40 is inserted into the two bearings 30, 31, and the rotor yoke 50 is arranged to cover the cylindrical portion 11 of the housing 10. The two bearings 30, 31 are slide bearings formed of a sintered oil-retaining metal member. The inner peripheral surface of the bearings 30, 31 makes up the bearing surface, with which the shaft 40 slides, so that the oil (lubricating oil) oozes out from the surface of the bearing. This oil makes up an intermediary between the shaft 40 and the bearing surface constituting the inner peripheral surface of the bearings 30, 31. Thus, the shaft 40 is rotatably supported without direct contact with the bearing surface.

The stator 70 in radially opposed relation with the magnet 60 with a gap is fixed by adhesive, for example, on the cover cylindrical portion 24 of the cover 20. The stator 70 is formed of a stator core 71 having a plurality of core members and a winding 72 wound on the stator core 71.

At the upper part of the stator 70 along the rotary shaft, a circuit board 80 is arranged in such a manner as to cover the rotor and the stator 70. The circuit board 80 is fixed at the upper end part the cover cylindrical portion 24 of the cover 20 at the upward forward end of the rotary shaft. At the lower part of the circuit board 80 along the rotary shaft, a hall element 81 is arranged in opposed relation with the magnet 60 through a gap formed along the rotary shaft. Above the circuit board 80 as viewed in axial direction, a control IC 82 is arranged.

Next, the essential parts of the invention are explained with reference to FIGS. 1 to 6.

First, the relation between the rotor yoke 50 and the bearings 30, 31 fixed to the housing cylindrical portion 12 of the housing 10 is explained with reference to FIG. 1.

Figure 7:
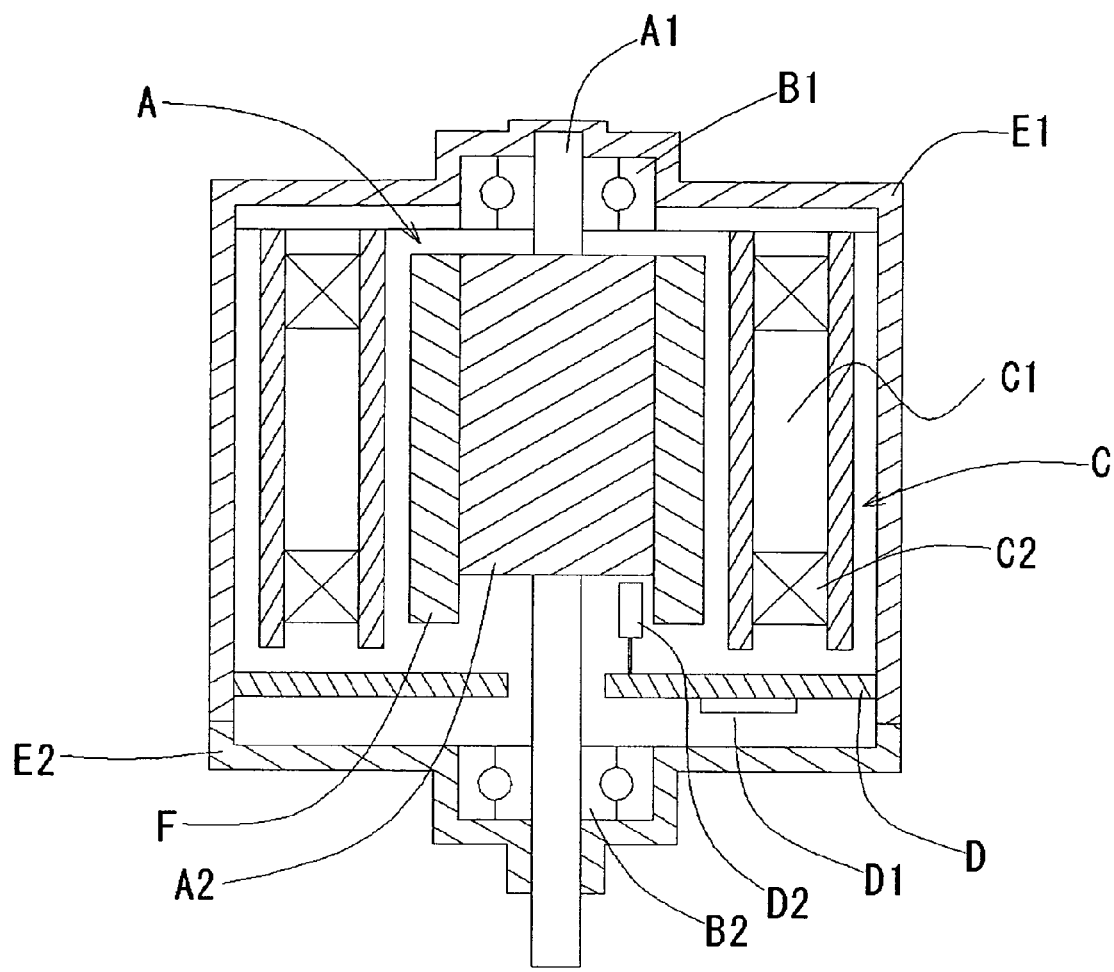
FIG. 7 is a sectional view taken in axial direction of the motor according to an example of the prior art.

Referring to FIG. 1, the housing 10 is seen to be erected inside the rotor yoke 50. Comparison with the prior art in FIG. 7 shows that in FIG. 7, the rotor core A2 is arranged with the rotor yoke 50 and, being not hollow, nothing can be arranged therein. Therefore, the bearings B1, B2 are arranged above and under the rotor core A2 as viewed in axial direction. This motor structure poses the problem that the motor size is required to be increased by an amount corresponding to the space occupied by the bearings B1, B2. As compared with FIG. 7, FIG. 1 shows that the rotor yoke 50 is hollow and the bearings 30, 31 are arranged in the rotor yoke 50. Therefore, no space is required to arrange the bearings above and under the rotor yoke 50 as viewed in axial direction, and the motor can be reduced in size.

Next, a case in which two bearings are fixed to the inner peripheral surface of the housing cylindrical portion 12 of the housing 10 is explained with reference to FIG. 1.

Referring to FIG. 1, as described above, a felt 32 is arranged between the two bearings 30, 31 in such a manner as to couple the two bearings to each other. This felt 32 supplies the oil (lubricating oil) to the bearings whenever required in accordance with the oil consumption rate of the bearings. The life of the bearings is generally considered to expire when the oil content of the bearings decreases to the limit oil content. The period before the oil content is reduced to the limit oil content can be lengthened by holding an increased amount of oil and decreasing the oil consumption rate. During the use of this felt 32, the oil consumption in the bearings 30, 31 is supplemented by the felt 32. As long as the oil is contained in the felt 32, therefore, the oil consumption by the bearings 30, 31 is saved. This prevents the reduction in oil content, and the bearing life can be lengthened by the oil amount held in the felt 32.

Next, a case in which one bearing is fixed to the inner peripheral surface of the housing cylindrical portion 12 of the housing 10 is explained with reference to FIG. 2.

Figure 2:
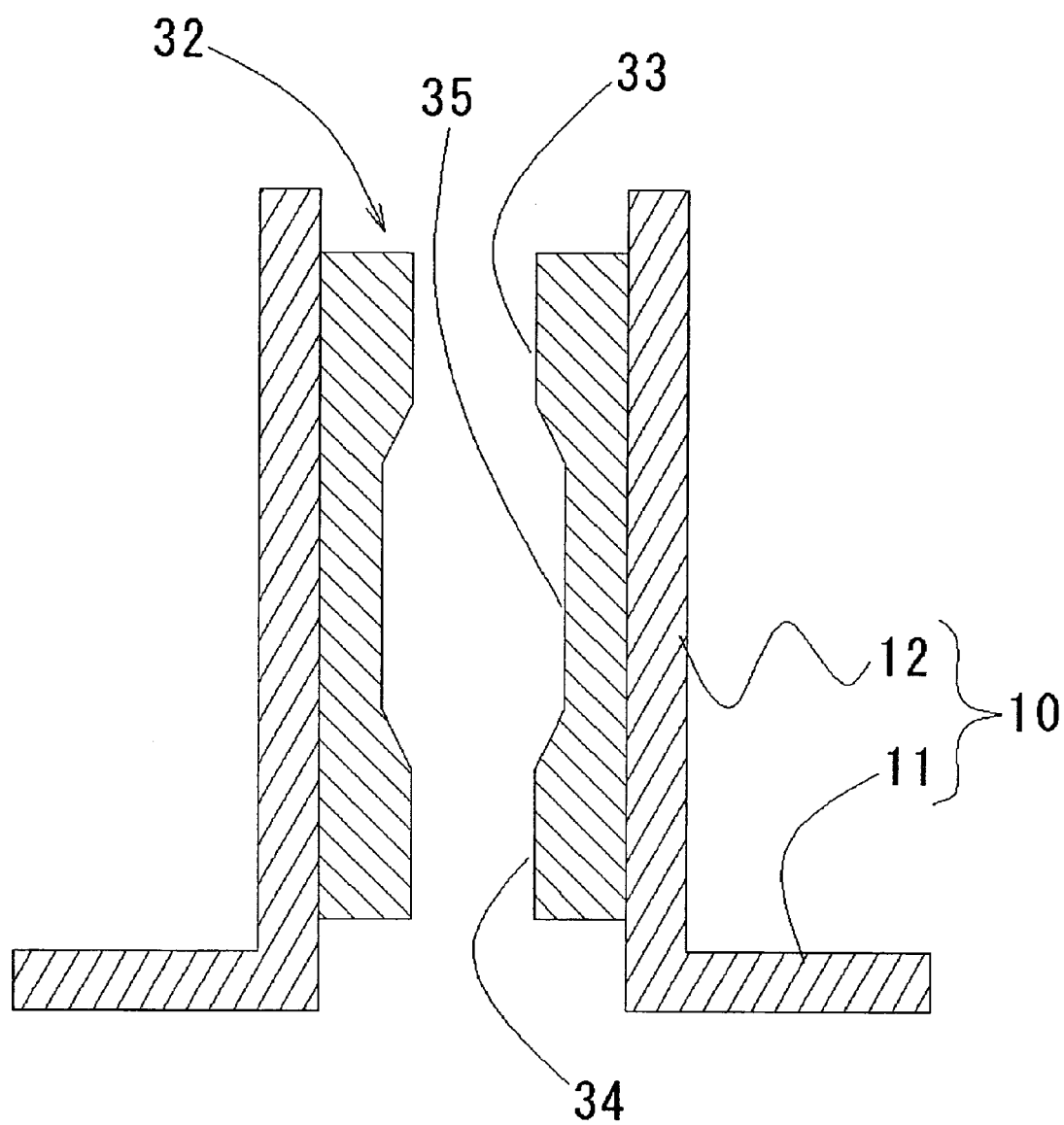
FIG. 2 is a sectional view of the motor taken in axial direction with the bearings unified in the housing.

Referring to FIG. 2, the inner peripheral surface of the housing cylindrical portion 12 of the housing 10 is fixed with one bearing 32. This bearing 32 includes portions 33, 34 adapted to slide with the shaft 40 upward and downward, respectively, along the rotary shaft thereof. The shaft 40 is rotatably supported by being inserted into the sliding portions 33, 34. The portion 35 not adapted to slide with the shaft 40 is slightly recessed to prevent the contact with the shaft 40. The bearing 32 thus unified includes the non-sliding portion 35 in addition to the sliding portions 33, 34, and therefore has a correspondingly larger bearing volume. The slide bearing can contain the oil of an amount equivalent to the volume thereof, and therefore the oil content is increased by an amount equal to the volume increase of the bearing, thereby increasing the oil amount held. As a result, the time before oil depletion and the life of the bearing can be lengthened.

Next, the fitting relation between the rotor yoke 50 and the magnet 60 is explained with reference to FIG. 3.

Figure 3:
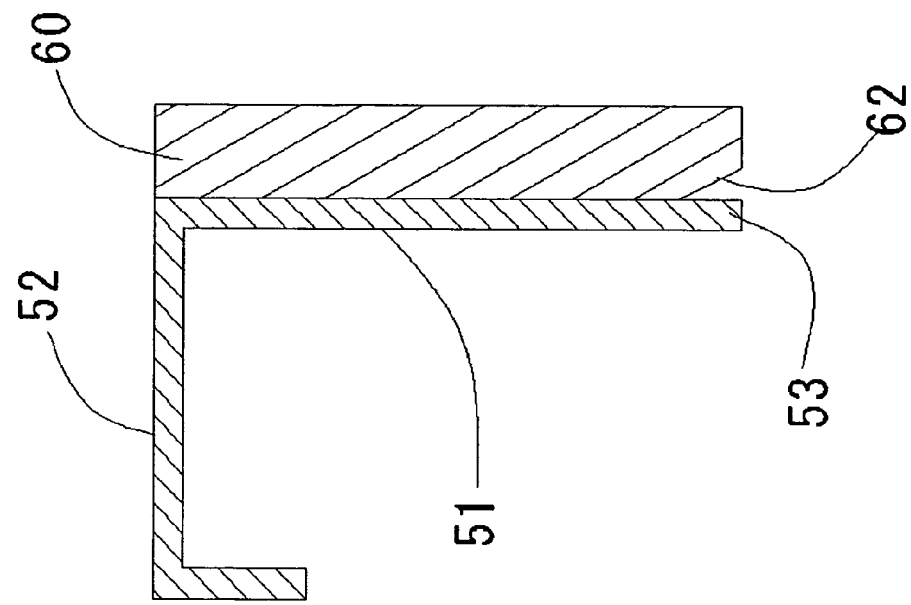
FIG. 3 is a diagram showing a rotor yoke and a magnet fitted on each other.
Figure 3:
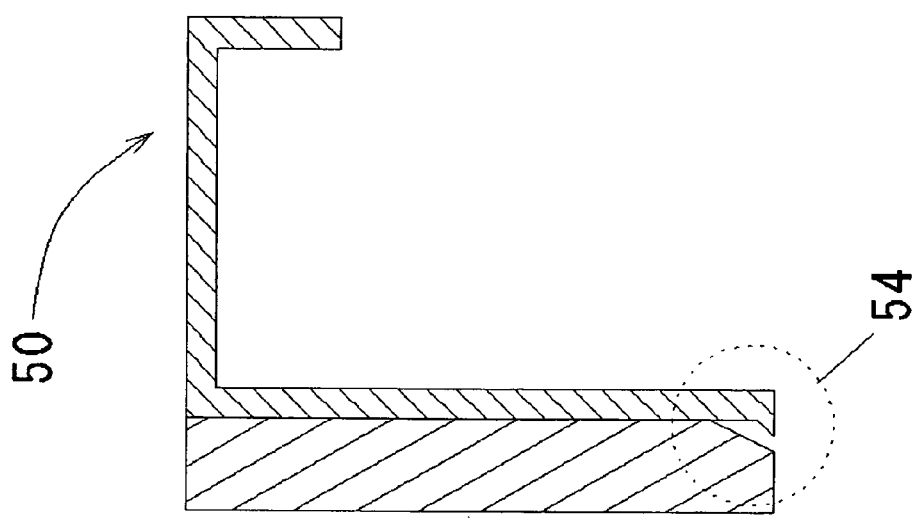

In FIG. 3, the magnet 60 is fixed to the outer peripheral surface of the yoke cylindrical portion 51 of the rotor yoke 50. A tapered surface 62 is formed at the lower part of the magnet 60 along the rotary shaft. An inner diameter of the tapered surface 62 is getting wider as going downward in axial direction. The outer periphery of the forward end 54 of the yoke cylindrical portion 51 of the rotor yoke 50 along the rotary shaft may develop a protrusion or a burr as designated by numeral 54 in FIG. 3 when forming the rotor yoke 50. This tapered surface 62 constitutes a relief surface of the forward end 54 of the rotor yoke 50. Regardless of a protrusion or a burr which may be formed at the forward end 54 of the rotor yoke 50, therefore, the magnet 60 can be fixed to the outside of the rotor yoke 50 accurately. As a result, the magnet 60 can be arranged in a predetermined spaced relation with the stator 70.

Figure 4:
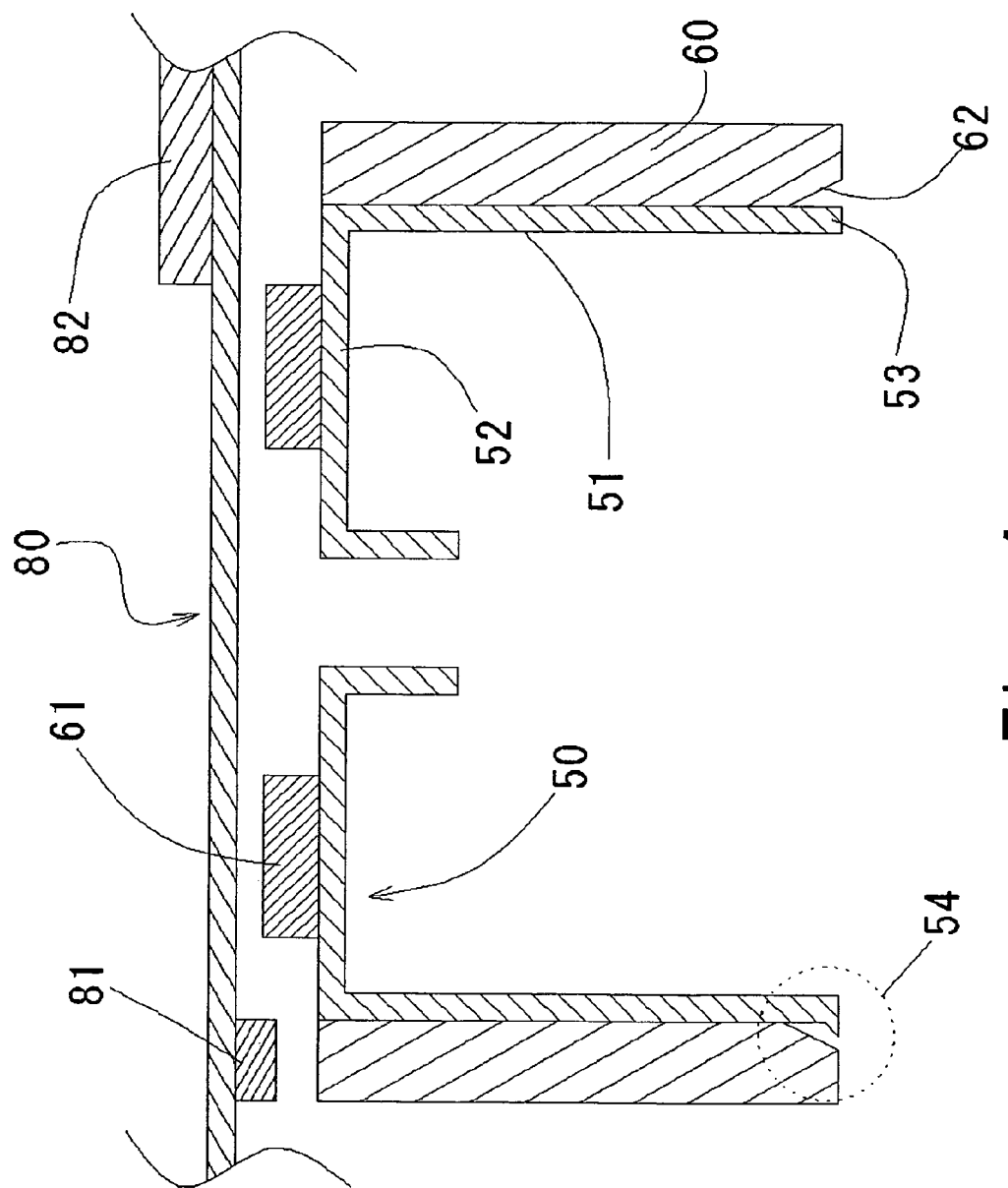
FIG. 4 is a diagram showing the relation between a FG magnet and a circuit board.

Next, the relation between the rotor yoke 50, the FG magnet 61 and the circuit board 80 is explained with reference to FIG. 4.

An annular FG magnet 61 is fixed above the roof surface portion 52 of the rotor yoke 50 as viewed in axial direction. The circuit board 80 is arranged in opposed relation with the FG magnet 61 through a gap along the direction of the rotary shaft. The circuit board 80 is formed with a FG pattern in a part thereof in opposed relation to the FG magnet 61. In the prior art, the Hall element 81 can control only to the extent of the number of poles of the magnet 60. The arrangement of the FG magnet 61 and the FG pattern, on the other hand, makes it possible to control to the extent of the power generating element additionally. Thus, a more finely detailed position control operation is made possible. As a result, the accuracy of the motor rotation control operation is increased. The performance of the Hall element 81 may be deteriorated in a high-temperature environment. The use of the FG magnet and the power generating element at the same time, however, can maintain a stable performance even in a high-temperature environment and therefore the operating temperature range can be increased.

Figure 5:
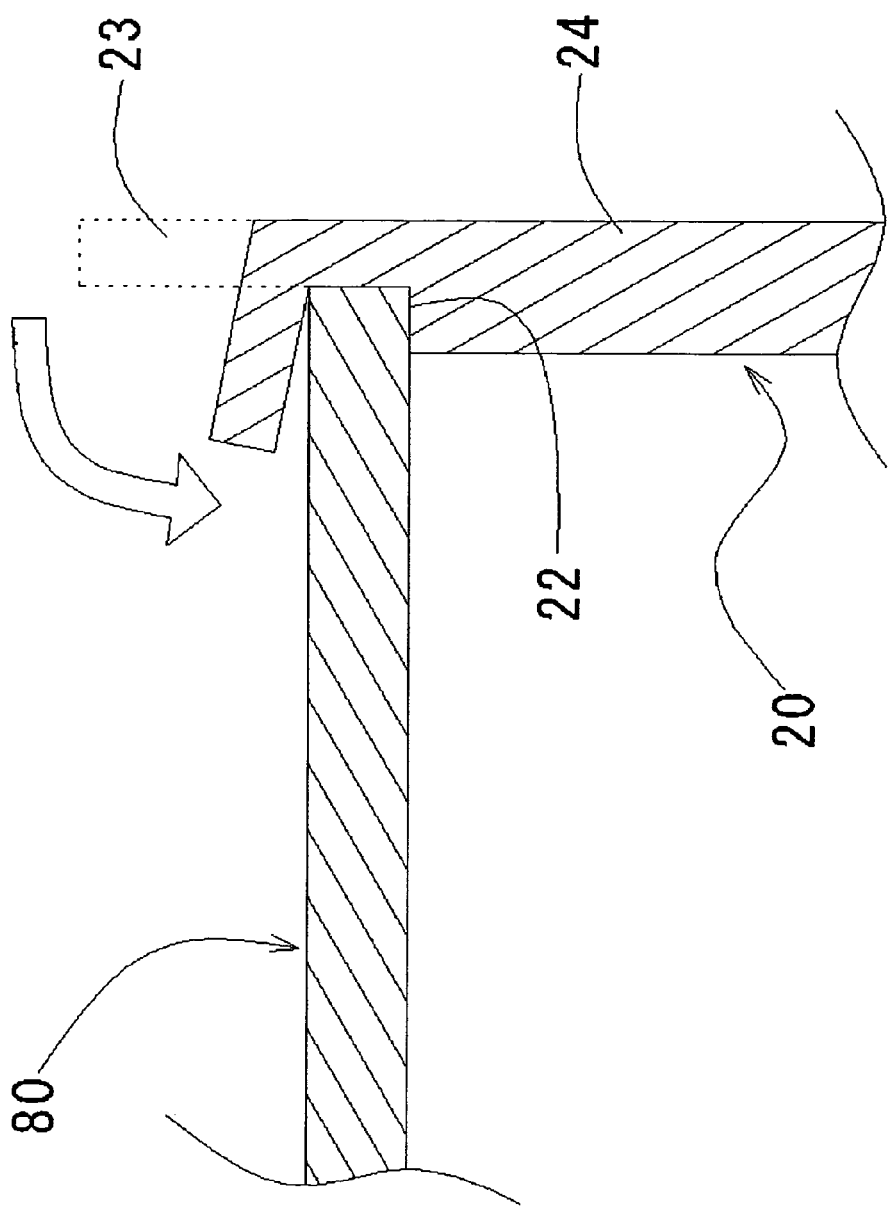
FIG. 5 is a diagram showing the fitting relation between the circuit board and a cover.

Next, the coupling relation between the cover 20 and the circuit board 80 is explained with reference to FIG. 5.

An inner surface of the upper end part of the cover cylindrical portion 24, a radially recessed step 22 and an upward protrusion 23 of the recessed step 22 are formed at the upper part as viewed in the axial direction. The circuit board 80 is arranged in contact with the recessed step 22 of the cover 20. The protrusion 23 of the cover 20 is tilted inward under pressure in a press, for example, thereby to fix the circuit board 80. Generally, the circuit board and the mating parts are fixed to each other using fastening means such as screws. In the method according to the invention, however, the screws or the like to fix the circuit board 80 are eliminated for a reduced cost. Also, the method using the fastening means such as screws makes it necessary to fix a plurality of points to secure reliability, which in turn requires many screws while at the same time increasing the number of steps for an increased cost. In the method according to the invention, in contrast, a plurality of points are pressed at the same time, and therefore a highly reliable fixing method is achieved without increasing the number of steps. Further, since the circuit board 80 has such a structure as to cover the motor, the parts for covering the motor are saved to reduce the cost. Also, in view of the fact that the circuit board 80 is not accommodated in the motor but the control IC 82 is arranged outside of the motor, the heat generated in the control IC 82 is not contained in the motor but radiated outside of the motor. Furthermore, the control IC 82 being kept in contact with the external air can be cooled all the time.

Next, the relation between the rotor yoke 50 and the fan 90 is explained with reference to FIG. 6.

Figure 6:
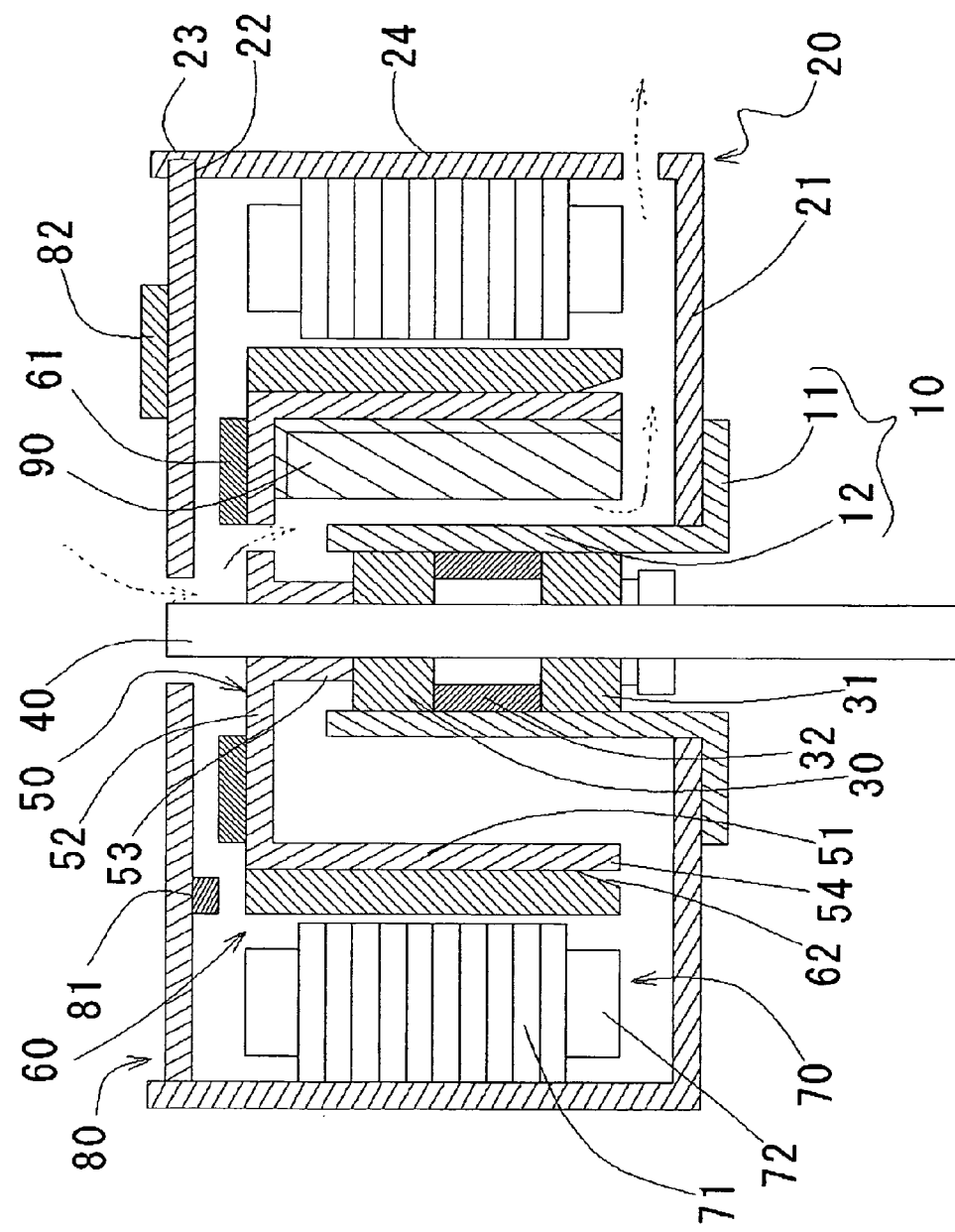
FIG. 6 is a sectional view taken in axial direction of the motor with a fan mounted in the rotor yoke.

Referring to FIG. 6, the fan 90 is fitted in the rotor yoke 50. At least one through hole is formed in each of the roof surface portion 52 of the rotor yoke 50 and the lower part of the stator 70 along the rotary shaft in the cover cylindrical portion 24 of the cover 20. The FG magnet 61 is arranged outside of the through hole formed in the roof surface portion 52 of the rotor yoke 50. The central portion of the circuit board 80 is formed with a through hole in which the shaft 40 is loosely fitted. As a result, the external air introduced into the motor is discharged again through the central through hole of the circuit board 80, the through hole of the roof surface portion 52 of the rotor yoke 50 and the through hole of the cover cylindrical portion 24 of the cover 20, as shown by dotted arrow in FIG. 6. The fan has a blade similar to that of the sirocco fan, for example, so that the air introduced into the circuit board 80 is discharged by way of the through hole of the cover cylindrical portion 24 of the cover 20. In this way, the outside air can be introduced into the motor and the air heated in the motor can be discharged outside efficiently. Also, the outside air not heated is introduced into the motor and accelerated by the fan in the motor, so that the air heated by the stator 70 can be pushed out of the motor and thus can cool the motor. The fan 90 according to the invention is integrally formed and fitted in the rotor yoke 50, thereby leading to a high assembly workability and a high angular accuracy of the impellers.

A brushless motor according to an embodiment of the invention is explained above. This invention, however, is not limited to this embodiment, and can be variously modified or altered without departing from the scope of the invention.

The invention has the advantages described below.

Specifically, a brushless motor having a rotational axis comprising: a cover for covering an outer part of the motor, the cover having a cover cylindrical portion with a bottom surface downward and with a open end upward; a housing having a housing cylindrical portion, the housing connected fixedly with a central portion of the bottom surface of the cover and the housing cylindrical portion located at a rotationally symmetric location around the rotational axis; a bearing fixed to an inner peripheral surface of the housing cylindrical portion; a rotary shaft rotatably supported by the bearing about the rotational axis; a rotor yoke located at an upper part of the housing, the rotor yoke having a rotary shaft connecting portion connected fixedly with an outer surface of the rotary shaft, a roof surface portion connected integrally with an upper end of the rotary shaft connecting portion and extending radially outward, and a yoke cylindrical portion connected integrally with a radially outer end of the roof surface portion and extending axially downward for covering the housing; a main magnet fixed on an outer peripheral surface of the yoke cylindrical portion; a stator fixed on an inner peripheral surface of the cover cylindrical portion and an inner surface of the stator confronting an outer peripheral surface of the main magnet with a gap; a circuit board located at an upper part of the cover, wherein an outer end of the circuit board is fixed to an upper end part of the cover; and a position sensor mounted on the circuit board for detecting the rotational position of the rotor; wherein the rotary shaft, the bearing, the housing cylindrical portion, the yoke cylindrical portion, the main magnet, the stator and the cover cylindrical portion are arranged in order radially outward from the rotary shaft to the cover.

In the brushless motor according to this invention, the housing is erected on the inside of the rotor yoke, and the bearing is arranged along the height of the rotary shaft inside of the rotor yoke. Therefore, the height along the direction of the rotary shaft can be reduced. Also, the bearing is arranged on only one housing. As compared with a case in which the bearing is arranged with a different part, therefore, the assembly error of different parts is eliminated and the coaxiality accuracy of the bearing improved. As a result, the accuracy of the rotary shaft member inserted in the bearing is improved.

The bearing according to this invention is a single slide bearing having a length at least one half of the length of the housing cylindrical portion in axial direction.

According to this invention, the unified single bearing fixed to the housing can lengthen the size in the direction along the bearing axis. The lubricant oil can be retained more by an amount corresponding to the increased length along the bearing axis, and therefore the period before depletion of the lubricant oil is lengthened, thereby leading to a longer service life of the motor.

The bearing according to the invention includes two slide bearings fixed to the inner peripheral surface of the housing cylindrical portion in spaced relation with each other in axial direction, and an oil retaining member impregnated with an oil is retained between the two bearings in axial direction.

According to the invention, the two bearings are fixed to the housing and arranged as an integral part to shorten the distance between the two bearings. As a result, the oil supplement member such as felt can be inserted between the bearings. The arrangement of the oil holding member such as the felt can supplement the lubricating oil impregnated in the slide bearing, and therefore the motor life can be lengthened.

A FG magnet according to the invention is fixed on the side of the roof surface portion on which the circuit board is arranged, and a FG pattern is formed on a part of the circuit board which is in opposed to the FG magnet with a gap in axial direction.

According to the invention, the provision of the FG magnet and the power generating element contributes to the detection of the rotational position of the motor in a more detailed fashion, and therefore the rotational position can be grasped with a higher accuracy. Thus, the rotation accuracy of the motor can be improved.

According to the invention, at an inner and lower end part of the main magnet a tapered surface of which an inner diameter is getting wider as going downward in axial direction, the tapered surface constitutes a relief surface from the yoke.

According to this invention a protrusion or a burr may occur at the open end of the cylindrical portion radially outer side of the rotor yoke at the time of forming the rotor yoke. An attempt to fit the magnet on the outer peripheral side of the cylindrical portion of the rotor yoke, therefore, may cause a projection from only the particular portion of the magnet due to the protrusion and burr, thereby making a highly accurate fitting impossible. This also makes it impossible to form a predetermined gap between the stator and the magnet. According to claim 5 of the invention, the magnet portion in contact with the end surface of the cylindrical portion of the rotor yoke is formed with a tapered surface constituting a relief surface thereby to eliminate the effect of the protrusion or burr which otherwise might have on the cylindrical portion of the rotor yoke.

The cover according to this invention has a radially recessed step on an inner surface of the upper end part of the cover cylindrical portion, and an outer cover cylindrical portion projected from the recessed step to a position having a height larger than the thickness of the circuit board, and after the circuit board is arranged in contact with the recessed step, the outer cover cylindrical portion is deformed inner-ward thereby to fix the circuit board on the cover.

Generally, the circuit board is fixed on the mating parts using screws or the like. This fixing method, however, requires screws or the like and therefore the number of parts increases for a higher cost. Also, the use of screws or the like cannot maintain a sufficient reliability, if fixed only one point, and requires at least two fixing points. This correspondingly increases the job process and cost. According to the invention described in claim 6, however, the cover and the circuit board are fixed on each other by the plastic deformation of the cover without using any screws or the like. Thus, the fixing parts are reduced in number for a lower cost. Also, sine a plurality of points are fixed, a highly reliable fixing result is obtained. Further, the plastic deformation of the cover is accomplished at a time in the press and therefore the job process is reduced for a lower cost.

At least one cover through hole according to this invention is formed on a side of the cover cylindrical portion at a nearer place to the bottom surface from the position at which the stator is fixed, and the roof surface portion of the rotor yoke has at least one rotor yoke through hole, thereby constituting a fan in which with the rotation of the rotor yoke, the external air is introduced into the rotor yoke from the rotor yoke through hole and discharged outside of the cover through hole.

According to this invention, the rotor yoke and the cover are each formed with at least one through hole, thus forming a path in which the outside air passes through the motor and exits into the atmosphere. Also, the provision of a fan in the rotor yoke can form an air flow in which the air is introduced from outside and discharged through the cover through hole. As a result, the internal air of the motor heated by the heat generated from the stator in the motor can be released out of the motor, while the cool air can be introduced from outside the motor into the motor, thereby making it possible to efficiently cool the interior of the motor.

The fan according to this invention includes a fan cylindrical portion integrally formed by resin with a plurality of impellers arranged along the peripheral direction on the inner peripheral surface of the yoke cylindrical portion.

The fan can be formed inside the rotor yoke in any of several ways, including a method in which the rotor yoke is deformed, i.e. the inner side of the rotor yoke is projected, and a method in which fans are fitted inside the rotor yoke one by one. The method in which the rotor yoke is deformed poses the problem that the outer peripheral side of the rotor yoke is also deformed and the magnet cannot be fixed with high accuracy. According to the method in which the fans are fitted on the inside of the rotor yoke one by one, on the other had, the workability is low and it is difficult to set all the impellers at a predetermined angle.

According to this invention, in contrast, the impellers of the fan are integrally formed with resin and the integrated fan is fitted inside of the rotor yoke. Therefore, the fans can be fitted in one process with a higher workability. Also, the impellers are integrally formed as a first step, and therefore a fan having a high angular accuracy of the impellers is provided. Further, the rotor yoke is not deformed, and therefore the outer peripheral side of the rotor yoke is not deformed, so that the magnet can be fixed with high accuracy.

What is claimed is:

1. A brushless motor having a rotational axis comprising:
    a cover for covering an outer part of the motor, the cover having a cover cylindrical portion with a bottom surface downward and with a open end upward;
    a housing having a housing cylindrical portion, the housing connected fixedly with a central portion of the bottom surface of the cover and the housing cylindrical portion located at a rotationally symmetric location around the rotational axis;
    a bearing fixed to an inner peripheral surface of the housing cylindrical portion;
    a rotary shaft rotatably supported by the bearing about the rotational axis;
    a rotor yoke located at an upper part of the housing, the rotor yoke having a rotary shaft connecting portion connected fixedly with an outer surface of the rotary shaft, a roof surface portion connected integrally with an upper end of the rotary shaft connecting portion and extending radially outward, and a yoke cylindrical portion connected integrally with a radially outer end of the roof surface portion and extending axially downward for covering the housing;
    a main magnet fixed on an outer peripheral surface of the yoke cylindrical portion;
    a stator fixed on an inner peripheral surface of the cover cylindrical portion and an inner surface of the stator confronting an outer peripheral surface of the main magnet with a gap;
    a circuit board located at an upper part of the cover, wherein an outer end of the circuit board is fixed to an upper end part of the cover; and
    a position sensor mounted on the circuit board for detecting the rotational position of the rotor;
    wherein the rotary shaft, the bearing, the housing cylindrical portion, the yoke cylindrical portion, the main magnet, the stator and the cover cylindrical portion are arranged in order radially outward from the rotary shaft to the cover.

2. A brushless motor according to claim 1,
    wherein the bearing is a single slide bearing having a length at least one half of the length of the housing cylindrical portion in axial direction.

3. A brushless motor according to claim 1,
    wherein the bearing includes two slide bearings fixed to the inner peripheral surface of the housing cylindrical portion in spaced relation with each other in axial direction, and an oil retaining member impregnated with an oil is arranged between the two bearings in axial direction.

4. A brushless motor according to claim 1,
    wherein a FG magnet is fixed on the side of the roof surface portion on which the circuit board is arranged, and a FG pattern is formed on a part of the circuit board which is in opposed to the FG magnet with a gap in axial direction.

5. A brushless motor according to claim 1,
    wherein at an inner and lower end part of the main magnet a tapered surface of which an inner diameter is getting wider as going downward in axial direction, the tapered surface constitutes a relief surface from the yoke.

6. A brushless motor according to claim 1,
    wherein the cover has a radially recessed step on an inner surface of the upper end part of the cover cylindrical portion, and an outer cover cylindrical portion projected from the recessed step to a position having a height larger than the thickness of the circuit board, and
    after the circuit board is arranged in contact with the recessed step, the outer cover cylindrical portion is deformed inner-ward thereby to fix the circuit board on the cover.

7. A brushless motor according to claim 1,
    wherein at least one cover through hole is formed on a side of the cover cylindrical portion at a nearer place to the bottom surface from the position at which the stator is fixed, and the roof surface portion of the rotor yoke has at least one rotor yoke through hole, thereby constituting a fan in which with the rotation of the rotor yoke, the external air is introduced into the rotor yoke from the rotor yoke through hole and discharged outside of the cover through hole.

8. A brushless motor according to claim 7,
    wherein the fan includes a fan cylindrical portion integrally formed by resin with a plurality of impellers arranged along the peripheral direction on the inner peripheral surface of the yoke cylindrical portion.

* * * * *